Dec. 2, 1941.  F. J. WESTROPE  2,264,601
VISOR
Filed June 24, 1940   2 Sheets-Sheet 1
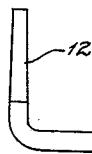
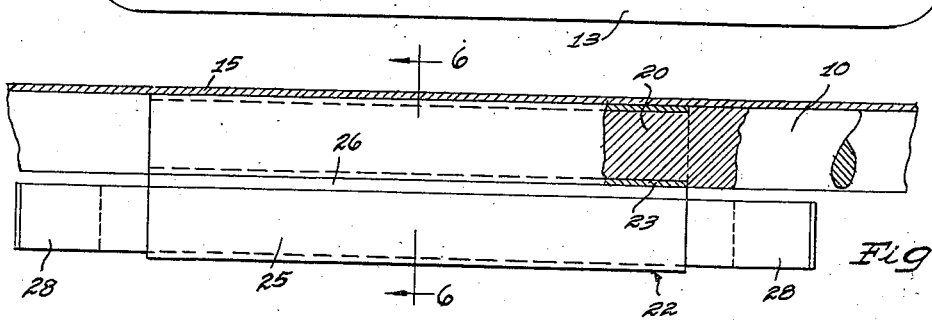
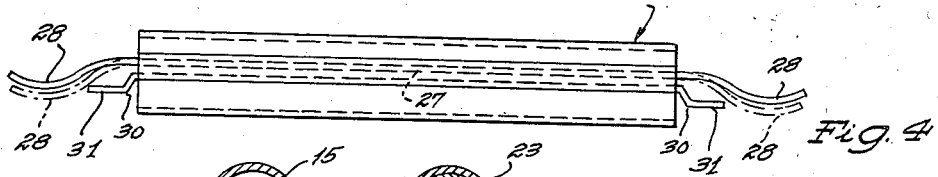
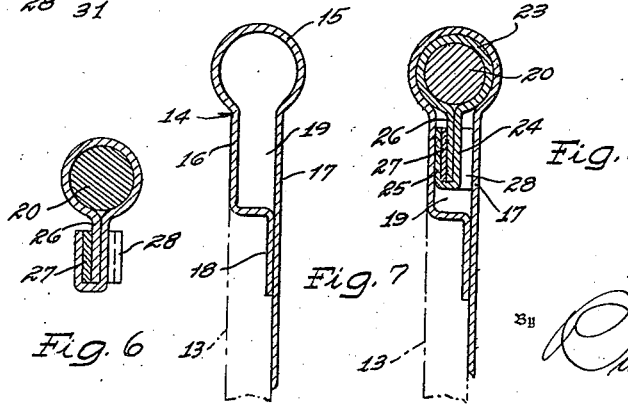
Inventor
FREDERICK J. WESTROPE.
By
Attorneys Dec. 2, 1941.  F. J. WESTROPE  2,264,601
VISOR
Filed June 24, 1940  2 Sheets-Sheet 2
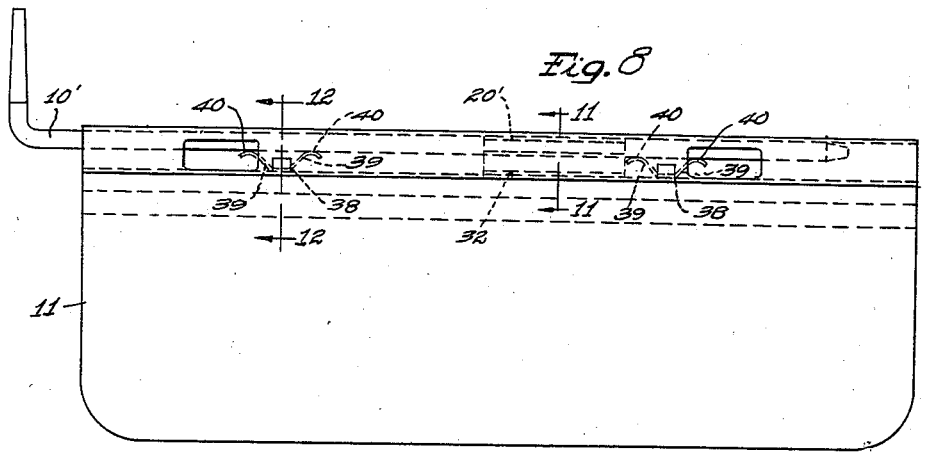
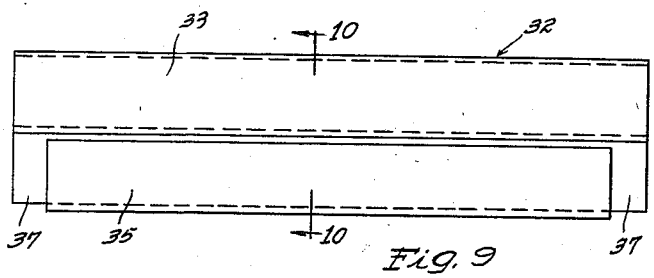
Fig. 9
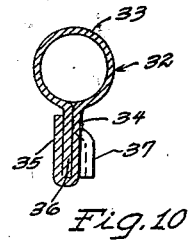
Fig. 10
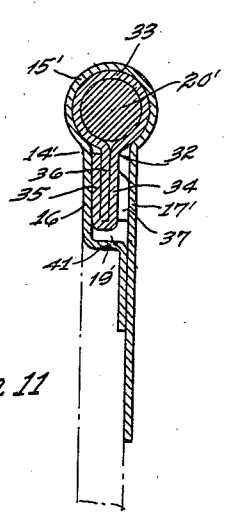
Fig. 11
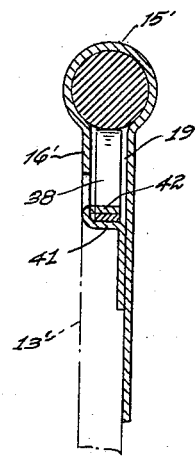
Fig. 12
Inventor
FREDERICK J. WESTROPE.
By 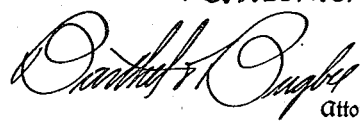
Attorneys Patented Dec. 2, 1941

2,264,601

UNITED STATES PATENT OFFICE 2,264,601

VISOR

Frederick J. Westrope, Pleasant Ridge, Mich., assignor, by mesne assignments, to Reconstruction Finance Corporation, Detroit, Mich., a corporation of the United States Application June 24, 1940, Serial No. 342,111

4 Claims. (Cl. 296—97)

This invention relates generally to visors and more particularly to visors for motor vehicles.

It is an object of the present invention to provide a new and improved visor of the character in which the shield thereof is movable about a supporting rod to various positions of adjustment and is also shiftable along the rod to other positions of adjustment.

Another object of the invention is to provide a visor of the above mentioned character which will remain in any position of adjustment either about the axis of its supporting rod or in any position to which it is moved along the rod and yet to provide a visor of this character which may be easily and quickly shifted from one position to another without need of releasing securing or attaching means.

Another object of the invention is to provide a visor having the above mentioned desired features and yet one which is inexpensive to manufacture.

Other objects of the invention will become apparent from the following detailed description taken in connection with the accompanying drawings in which—

Fig. 1 is a side view of a visor structure embodying features of the invention;

Fig. 2 is a side view of a supporting rod of the visor;

Fig. 3 is an enlarged view partly in elevation and partly in section showing certain details of the visor structure;

Fig. 4 is a top plan view of a part of the visor structure shown removed from the assembled structure of Fig. 3;

Figs. 5, 6 and 7 are cross sectional views of the visor structure, taken along the lines 5—5, 6—6 and 7—7, respectively, of Fig. 1;

Fig. 8 is a side view of a modified form of visor structure;

Fig. 9 is a side view of a friction holding member shown removed from the visor structure; and Figs. 10, 11 and 12 are cross sectional views of the visor.

Referring to the drawings by characters of reference and first to Figs. 1 to 7 inclusive, the visor structure shown includes a supporting rod 10 on which a visor or glare shield 11 is mounted, the rod 10 having a bent end portion 12 for attachment by a bracket (not shown) to a motor vehicle above the windshield thereof. The visor includes a panel 13 which is preferably rectangular in shape and extending along one longitudinal edge of the panel 13 and rigidly secured thereto is a tubular member 14 having a tubular portion 15 which slidably fits over the rod 10. The tubular member 14 is preferably formed of sheet metal and is provided below the tubular portion 15 thereof with spaced side walls 16 and 17, a lower border portion 18 of the side wall 16 being offset to engage the side wall 17 to be suitably secured thereto such as by a welding operation. Thus, the side walls 16 and 17 cooperate to provide a space 19 below and communicating with the tubular portion 15, the space 19 extending preferably coextensive with the shield or with the panel 13. The shield 11 is mounted on the rod 10 for movement about the axis of the rod 10 to any radial position of adjustment desired and it is also shiftable along the rod to other positions of adjustment.

As is shown in Fig. 2, the supporting rod 10 is provided with a portion 20 thereof of reduced diameter and surrounding this reduced portion 20 there is an elongated, friction holding member, designated in general by the numeral 22, for holding the shield 11 in any position of adjustment about the longitudinal axis of the rod 10 and for holding the shield in any position of adjustment along the rod, or both. As shown, the friction holding member 22 is formed of sheet metal and is provided with a tubular portion 23 which snugly surrounds the rod reduced portion 20. From the reduced portion 23, one border portion or flange 24 of the friction holding member 22 extends downwardly into the space 19 and is then bent upwardly, as at 25, in spaced relation to a second downturned flange 26 of the tubular portion 23. Carried by the extended or flange portions of the tubular member 23, and tightly clamped between the opposed surfaces of the upturned portion 25 and of the downwardly extending portion 26 there is a metallic strip 27 which, as will later be seen, is tensioned to provide friction for holding the shield member 11 in desired adjusted positions along the rod 10. The metallic strip 27 extends longitudinally of the elongated holding member 14 and end portions or spring fingers 28 of the metallic strip 27 project beyond the ends of the flanges 24 and 26, as shown in Fig. 4, these end portions preferably being bent to provide convex surfaces for abutment with the inner wall surface of the wall 17. As represented by dot and dash lines in Fig. 4, the end portions or spring fingers 28 are initially bent and arranged such that, when the tubular member 14 of the shield is fitted over the rod 10, the fingers 28 will be forced inwardly by their engagement with wall 17 and thus will be placed and held under tension. The spring fingers 28 urge the upturned flange 25 against the inner surface of the wall 16 to provide friction therebetween for yieldingly holding the shield member against accidental movement longitudinally of the shaft 10. In addition to the spring fingers 28, the flange member 24 is provided with projections in the form of tabs 30 which extend from opposite ends of the flange 24 and slidably engage the inner surface of the wall 17.

In assembling the herein described visor structure, the sheet metal forming the holder 22 is wrapped tightly about the rod reduced portion 20 such that the tubular portion 23 will fit snugly around the reduced portion 20 and the tubular portion 15 of the shield is telescoped over the rod 10 and over the tubular portion 23 to hold the latter tightly to the rod. The friction thus obtained between the rod 20 and the inner surface of the tubular portion 23 will hold the shield in any of the various positions to which it may be moved and adjusted about the longitudinal axis of the rod 10. Also, when the tubular member 14 is fitted over the rod 10 and over the holder 22, the spring fingers 28 of the holder are disposed in the space 19 between the inner surfaces of the walls 16 and 17 which places the fingers under tension to provide the necessary friction to hold the shield in any position to which it may be adjusted along the rod 10. It will be noted that in moving the shield radially or about the axis of the rod 10 that the holder 22 swings therewith but that on movement of the shield longitudinally of the rod the tubular member 14 moves relative to the holder 22 which holder is limited in movement in opposite directions on the rod 10 by opposed shoulders formed as a result of the provision of the rod reduced portion 20.

Referring now to the modification shown in Figs. 8 to 12 inclusive, this visor structure includes a supporting rod 10' for a shield member 11', the supporting rod and shield member being the same in construction as those previously described and, therefore, being identified by corresponding but prime numerals. Disposed within the tubular member 14' and surrounding the reduced rod portion 20' there is a friction holding member, designated in general by the numeral 32, which holding member acts to hold frictionally the shield 11' in any position of adjustment about the axis of the rod 10'. The friction holder 32 includes the tubular portion 33 from which the sheet metal extends downwardly into the space 19' and is bent upwardly, as at 35, to hold a downturned flange portion 34 of the tubular portion 33 thereto. The upturned flange or border portion 35 engaging the downturned flange portion 36 draws the sheet metal tightly about the reduced rod portion 20' to provide suitable fraction therebetween for releasably holding the shield to the rod. In addition, the downturned flange portion 34 is provided with an offset 37 which frictionally engages the inner surface of the wall 17' and holds the upturned flange portion 35 against the inner surface of the wall 16'.

In order to insure that the shield member 11' will not accidentally be moved from any desired position of adjustment about the axis of the rod 10', a pair of longitudinally spaced, leaf spring members 38 are carried by and within the tubular member 14' and are held under tension by and against the rod 10'. The leaf springs 38 are each provided with a pair of oppositely extending spring fingers 39 which preferably have end portions thereof rounded, as at 40, and arranged such that their convex surfaces bear against the periphery of the rod 10'. As shown in Fig. 12, the leaf springs 38 seat on a lower horizontal portion 41 of flange 16', formed by the offset therein and are preferably held in place by tabs 42 formed out of the wall 16' which tabs are bent inwardly over central, flat portions of the leaf springs to hold the springs to the visor.

With the holder 23 in place on the rod reduced portion 20', the tubular portion 15' of the shield is fitted over the rod 10', the walls 16' and 17' respectively engaging the flange 35 and the offset portion 37 to force the parts tightly together thus providing friction between the parts to hold the visor in any position of adjustment along the rod 10'. Also, when the shield is fitted onto the rod 10', the springs 38 are engaged and placed under tension by the rod 10' thus setting up frictional forces for holding the shield member 11' in any position of radial adjustment to which the shield member may be desired to be positioned with respect to the axis of the rod 10'.

In either of the herein described structures, the visor panel is held firmly against movement in any position of adjustment and yet may be shifted along the rod quickly and with ease.

While I have shown and described my invention in detail it is to be understood that the same is to be limited only by the appended claims for many changes may be made without departing from the spirit and scope of the invention.

What I claim is:

1. In a visor structure, a supporting rod having a reduced portion intermediate its ends, a shield having a tubular portion fitted over said rod, said shield being movable about the longitudinal axis of said rod to various positions of adjustment and also being shiftable along said rod to other positions of adjustment, and a tubular member surrounding said rod reduced portion within said tubular portion for frictionally holding said shield to said supporting rod.

2. In a visor structure, a supporting rod having a reduced portion intermediate its ends, a shield having a tubular portion fitted over said rod and having a pair of spaced walls below said rod, said shield being movable about the axis of said rod to desired positions of adjustment and also being shiftable along said rod to other desired positions of adjustment, and a tubular member surrounding said rod reduced portion and having a downturned extending portion engaging the inner surfaces of said pair of walls for frictionally holding said shield in adjusted positions.

3. In a visor structure, a supporting rod having a reduced portion intermediate its ends, a shield having a tubular portion received on said rod and having a pair of spaced walls below said tubular portion, said shield being movable about the longitudinal axis of said rod to desired positions of adjustment and also being shiftable along said rod to other positions of adjustment, a tubular member surrounding said rod reduced portion and engaging said rod and said tubular portion for frictionally and releasably holding said shield in positions of adjustment about the longitudinal axis of said rod, said tubular member having a portion extending downwardly between said spaced walls and engaging an inner surface of one of said walls, and tensioned means carried by said last-named portion between said walls and engaging the inner surface of said other wall, said extended portion and said tensioned means cooperating with said walls to hold the visor in any position of adjustment relatively to said rod.

4. In a visor structure, a supporting rod having a reduced portion intermediate the ends thereof, a shield member having a tubular portion slidably fitted onto said rod, said shield member being movable about the longitudinal axis of said rod to various positions of adjustment and also being slidable along said rod to other positions of adjustment, a tubular member surrounding and engaging said rod reduced portion, said shield having a space below said tubular member between spaced walls, said tubular member having an extended portion projecting into said space and engaging the inner surface of one of said walls, and spring fingers carried by said extended portion within said space and held under tension against the inner surface of the other of said walls to hold the shield frictionally in positions of adjustment along said rod.

FREDERICK J. WESTROPE.